F. McCALLIN.
AUTOMOBILE FENDER.
APPLICATION FILED MAY 28, 1917.
1,233,589.
Patented July 17, 1917.
2 SHEETS—SHEET 1.
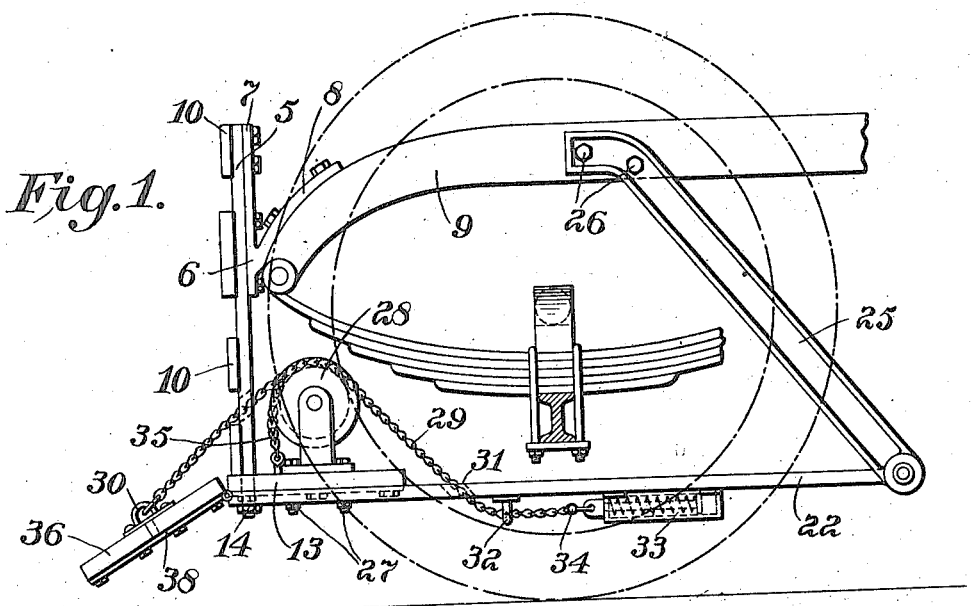
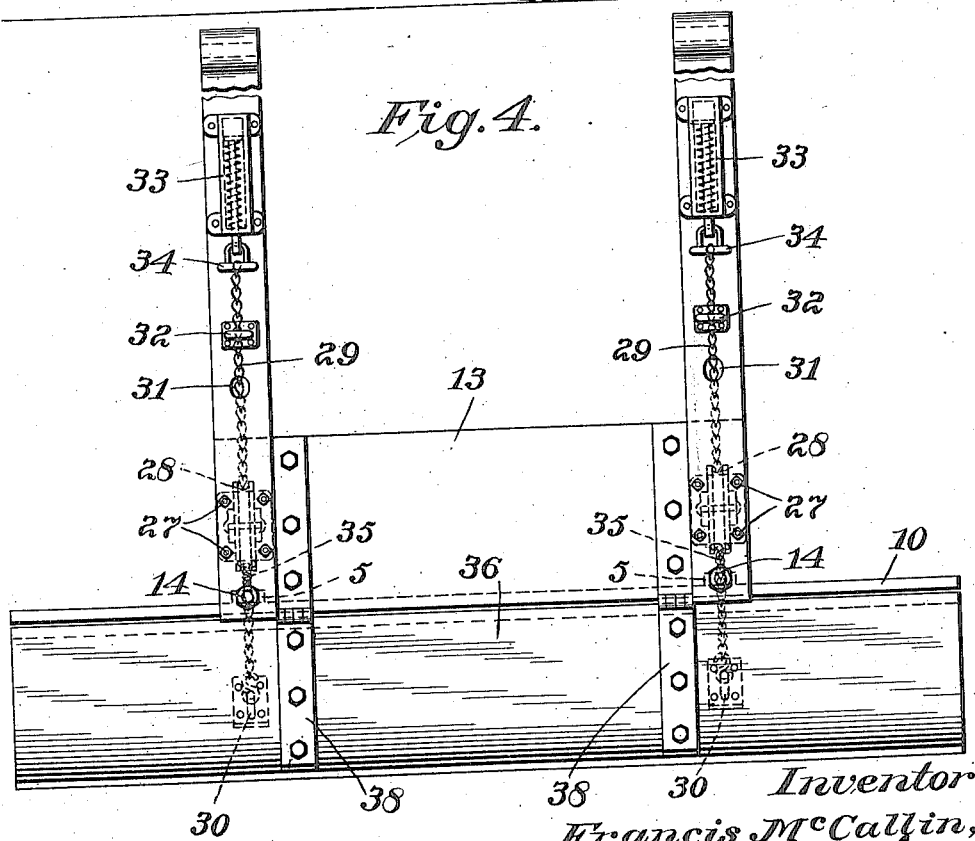
Inventor:
Francis McCallin,
by Parky Cow Atty.

F. McCALLIN.
AUTOMOBILE FENDER.
APPLICATION FILED MAY 28, 1917.
1,233,589.
Patented July 17, 1917.
2 SHEETS—SHEET 2.
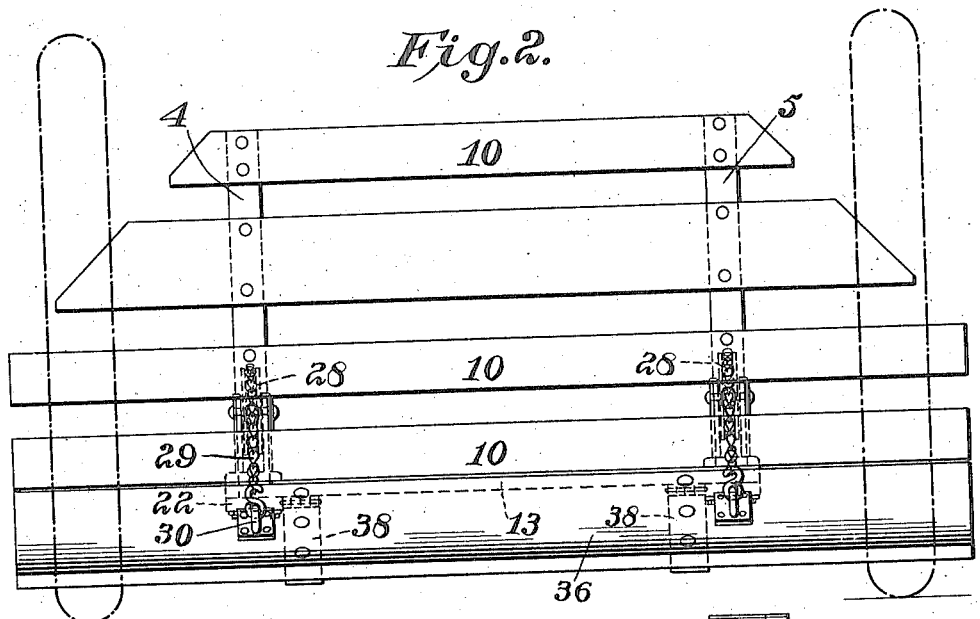
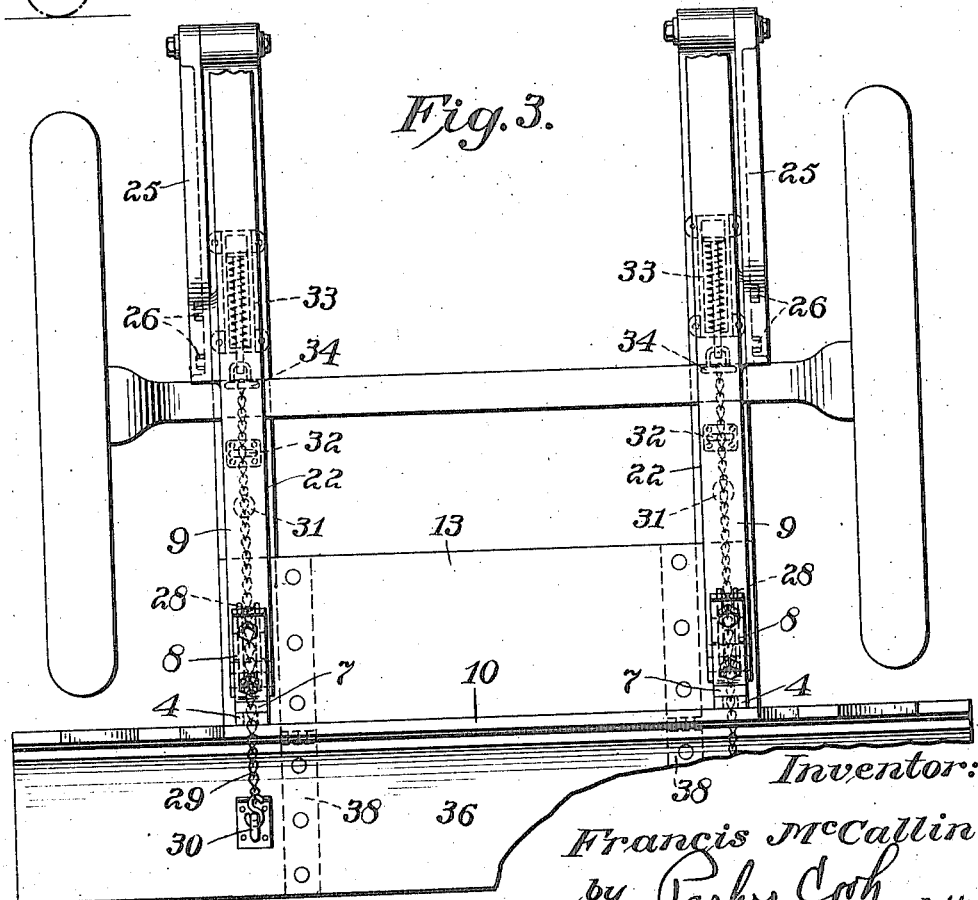
Inventor:
Francis McCallin,
by Parker Cook Atty.

UNITED STATES PATENT OFFICE.

FRANCIS McCALLIN, OF LONG ISLAND CITY, NEW YORK.

AUTOMOBILE-FENDER.

1,233,589.

Specification of Letters Patent.

Patented July 17, 1917.

Application filed May 28, 1917. Serial No. 171,336.

*To all whom it may concern:*

Be it known that I, FRANCIS McCALLIN, a citizen of the United States, residing at Long Island City, in the county of Queens and State of New York, have invented certain new and useful Improvements in Automobile-Fenders, of which the following is a specification.

My invention relates to a new and useful improvement on automobile fenders and particularly to a form of fender somewhat similar to that shown in Letters Patent No. 1,198,140, granted to me on the 12th day of September, 1916.
I have found that in the previous device by attaching part of the fender to the axle and other parts to the frame, the constant shifting relations between the two parts cause the fender to be continually shaken and loosened and to wear out many of the parts.

In the device hereinafter to be described, by attaching the uprights of the fender to the frame and by providing hangers extending downwardly from the frame and additional rods from the uprights mentioned back to the fender, I have overcome the objections present in the other form.

Also the fender as herein shown is somewhat cheaper to manufacture, easier to construct and just as efficient in service.

Furthermore, I have found it advisable to locate the pulleys and foundation board behind the upright portions of the fender rather than in front of the same, as shown in the previous patent, as the probabilities of the mechanism becoming damaged is far less when located behind the fender.

Referring now to the drawings, Figure 1 is a side elevation, with parts in section.

Fig. 2 is a front elevation with position of front wheels indicated in dotted lines.

Fig. 3 is a top plan view partly broken away, and Fig. 4 is a bottom plan view, the fender being detached.

Referring now to the drawings, it will be seen that my improved fender comprises first, two uprights 4 and 5, and secured to each of the uprights are the castings or hangers 6, one part of which is vertical as at 7, and the other portion 8 is curved or arched and adapted to be secured to the longitudinal frame 9 of the chassis of the automobile.

Other forms of securing the uprights to the frame might be used and I have simply selected the one shown as one means of accomplishing the same.

Extending between these uprights 4 and 5 are fastened the guards or strips 10, which are preferably of metal and as shown are securely fastened to the uprights and extend completely across the front of the automobile, the lower ones extending slightly beyond the wheels while the two above the same do not extend quite as far across, as if any one is struck it will be probably by the lower portion of the fender rather than the upper portion.

Located at the lower end of the uprights 4 and 5 is a foundation board 13, the lower end of the hangers 4 and 5 passing therethrough and secured by the bolts 14. This foundation board 13 is similar to the foundation board shown in my previous patent, but it is to be noticed that in this instance it is placed in back of the uprights 4 and 5 rather than in front of the same.

Extending inwardly from the uprights 4 and 5 are the two supports 22 which are fastened at their front end to the uprights 4 and 5. These extend rearwardly and are secured at their rear ends to hangers 25, which hangers are securely fastened at their upper ends as at 26 to the longitudinal frames of the machine.

The foundation board 13 is positioned on these two supports 22 and securely fastened by bolts 27 or any other desirable means. This foundation board adds rigidity to the fender as a whole.

Located on the foundation board and directly over the straps 22 are mounted the pulleys 28. In the description of the pulley and chain, etc., now following, it is to be understood that the parts are duplicated and a description of the one will apply to the other.

Passing over the pulley 28 is a chain 29 which extends forwardly to an eyelet 30. The rearward portion of the chain passes through an opening 31 in the support 22 and through the eyelet 32, and secured to a tension member 33 that is securely fastened to the under portion of the support 22. A stop member 34 is fastened to the chain so that before the tension member 33 has reached its limit, the stop member 34 will contact with the eyelet 32 to thus save the tension member from being destroyed.

A small chain 35 is fastened to the foundation board 13 near the base of the pulley 28 and may be removably fastened to the chain 29 so that the main chain 29 is limited in its rearward movement.

Hinged to the foundation board 13 is a board which I term the life guard 36, which may either be made of one piece or may be made of separate pieces and provided with the strap hinges 38, as shown. Secured near the opposite ends of this life guard are the heretofore mentioned eyelets 30 to which the chains 29 are fastened.

The operation of the device is as follows: The normal position of the fender is as shown in Fig. 1, that is the life guard extending slightly downwardly. If a pedestrian falls in front of the machine he will strike the life guard 36, and will naturally force it downwardly and backwardly. The shock, however, will be taken up by the tension on the chain 29 and the tension members 33, and the shock will, of course, not be as great as if these tension means were not provided.

Furthermore, the life guard 36 will swing down to a vertical position and make it impossible for the person struck to get under the machine. As soon as the individual is removed or moves from in front of the machine the tension member 33 will again pull the life guard to the position shown in Fig. 1. The regulation of the angle of this life guard of course can be varied by fastening the small chain 35 farther forwardly or rearwardly on the main chain 29.

From the foregoing it will be seen that in the present instance the foundation board is located in the rear of the uprights and guards so that the same is entirely out of the way, and if the automobile happens to strike another machine or heavy vehicle, the uprights 4 and 5 and the strips 10 will have to be damaged before the pulleys 28 are reached.

Furthermore, if a person is thrown in front of the machine he is not as apt to be hurt by striking a plane surface as if the foundation board were located in front of the upright portion of the fender.

Again, by securing the supports 22 at their rear ends to the hangers 25, there is no constant shifting relation between the different parts of the fender as the fender is entirely swung from the longitudinal frames of the chassis.

From the foregoing it will be seen that the fender incorporates the good features of my previous device and also overcomes the objectionable ones.

Having thus described my invention, what I claim as new and desire to secure by Letters Patent, is:

1. A fender comprising two uprights, bars extending between said uprights, means secured to said uprights for securing the same to the frames of an automobile, supports fastened at the forward end to the lower ends of said uprights, a board extending from one support to the other, a life guard pivotally connected to said board, means for preserving the tension on said life guard and means extending from the frames of an automobile to the rearward end of said supports to thereby retain the said supports in position.

2. A fender comprising two uprights, and means on said uprights for securing the same to the frames of an automobile, bars extending between said uprights, supports secured to the lower end of said uprights and extending rearwardly and hangers adapted to be fastened at their ends to the frame of an automobile and secured at their lower ends to said supports, a swinging member hinged at the front of the fender and tension means connected indirectly thereto to return the swinging member to its upward position and to take up the impact on said member when the same is struck.

3. An automobile fender comprising uprights and cross bars, said uprights adapted to be secured to the forward ends of the frame of an automobile, rearwardly extending supports secured to said uprights and a board extending transversely of said supports and located behind said uprights and said cross bars, a life guard fastened to said transversely located member and pulleys located on said life guard, a chain secured to said life guard and passing over said pulley and connected at its rear end to a tension member located on said support to thereby hold said life guard in a fixed position and to take up the shock when said life guard is forced downwardly.

4. A fender comprising two uprights, bars extending between said uprights, means on said uprights for securing the same to the frames of an automobile, a foundation board secured behind said uprights, said foundation board provided with two guide wheels, a life guard secured to the outer end of said foundation board, rearwardly extending supports fastened at their forward end to said foundation board and adapted to be securely held at their rearward end, tension elements secured to said rearwardly extending supports, chains connecting said tension elements and passing over said guide wheels and through said supports and foundation board to said life guard to return the said life guard to its upward position and to take up the impact on said life guard when the said life guard is struck.

5. A fender comprising two vertically extending uprights, a foundation board located to the rear of said uprights and positioned at their lower end, supports secured to said foundation board and extending rearwardly thereof, a life guard secured to the outer end of said foundation board, pulleys on said foundation board, tension members on said rearwardly extending supports, a chain fastened to said tension elements passing over said pulleys and connected with said life guard to hold the said life guard in a fixed position and to take up the shock when said life guard is forced downwardly.

In testimony whereof I affix my signature.

FRANCIS McCALLIN.

Copies of this patent may be obtained for five cents each, by addressing the "Commissioner of Patents, Washington, D. C."